(12) United States Patent
Gnocato et al.

(10) Patent No.: US 7,016,068 B1
(45) Date of Patent: Mar. 21, 2006

(54) SOFTWARE BASED METHOD FOR SIMULTANEOUSLY ASSOCIATING MULTIPLE, ORDERED COLLECTIONS OF PAGES WITH MULTIPLE IMPOSITIONS

(75) Inventors: Joe Gnocato, Coquitlam (CA); Afshin Mirmotahari, Victoria (CA); Jim Firstbrook, Brackendale (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 740 days.

(21) Appl. No.: 09/649,315

(22) Filed: Aug. 28, 2000

Related U.S. Application Data

(60) Provisional application No. 60/150,760, filed on Aug. 26, 1999.

(51) Int. Cl.
*G06F 15/00* (2006.01)

(52) U.S. Cl. ............... 358/1.18; 358/1.9; 358/1.12; 358/1.15

(58) Field of Classification Search ............ 358/1.18, 358/1.9, 1.12–1.13, 1.15; 715/500, 530
See application file for complete search history.

(56) References Cited

U.S. PATENT DOCUMENTS 5,857,209 A * 1/1999 Shively ............... 715/500

6,631,007 B1 * 10/2003 Buis et al. ............... 358/1.13

FOREIGN PATENT DOCUMENTS

EP    0 858 041 A2    8/1998
EP    0 887 746 A2    12/1998

OTHER PUBLICATIONS nth degree software, inc., *PROTEUS*(CD-ROM), 1998, pp. 1-63.
Sherry Stout, Ginni Swanton; ScenicSoft Preps—the complete imposition solution; Jun. 1998; Version 3.5; ScenicSoft, Inc.; Washington, USA.

* cited by examiner

*Primary Examiner*—Twyler M. Lamb
(74) *Attorney, Agent, or Firm*—Oyen Wiggs Green & Mutala LLP (57) ABSTRACT

A document's reader order list of pages represented in an imposition description file are decoupled from any single imposition. The decoupling mechanism is a software object called a pageset having positions associated with the pages of the document. A pageset may be associated with more than one imposition plan; more than one pageset may be associated with a single imposition plan; or more than one pageset can be associated with more than one imposition plan.

10 Claims, 8 Drawing Sheets

SOFTWARE BASED METHOD FOR SIMULTANEOUSLY ASSOCIATING MULTIPLE, ORDERED COLLECTIONS OF PAGES WITH MULTIPLE IMPOSITIONS

CROSS-REFERENCE TO RELATED APPLICATION

This application claims the benefit of U.S. Provisional Application No. 60/150,760, filed Aug. 26, 1999.

FIELD OF THE INVENTION

This invention relates generally to preparing documents for printing and, more specifically, to a method for associating multiple, ordered collections of pages with multiple impositions.

BACKGROUND OF THE INVENTION

Generally, modern printing production techniques for publications or documents such as books, magazines, and brochures, can be split into three major stages:
1. Prepress. In the prepress stage of production, documents are prepared for a printing device.
2. Printing. During this stage of production the information produced by the prepress system is duplicated on one or more large sheets of paper called print sheets, using a printing press plate, a digital printing system, or some other duplicator of printed material.
3. Finishing. In this stage the print sheets are folded, assembled and cut to form the final documents.

In the prepress stage, the individual pages of a document are prepared and ordered according to the page sequence of the final document. The final ordering of the pages is also referred to as the reader order. In order to achieve a desired reader order of the final publication, a pre-printing operation called imposition is required to arrange the individual pages into a layout that is suitable for the media that will ultimately be used to print the pages. Typically, the imposition layout is not in reader order, since the pages must be laid out onto the media with the understanding of how the media will be ultimately folded, cut and stacked in order to produce the final publication. The reader order is only one aspect that the imposition must consider; other considerations are the media size and how the media will be folded, cut and stacked. Imposition arranges the pages on one or more print sheets to achieve a proper sequence or position of each page relative to other pages. Imposition is performed to facilitate post-printing processes by defining the layout of the document's pages so that the pages can be properly imaged onto printing press plates. These plates are then used to print the pages onto one or more print sheets (stage 2, printing), which are later folded, cut and then bound to form the final printed document (stage 3, finishing).

Imposition may be performed manually by an expert familiar with the printing press, its operations, and the distribution of pages in the document, such as a newspaper, in order to design a particular imposition. A particular imposition will depend on several factors and may include, for instance, the editorial content, several different editions, advertisement requirements, and multiple production sites. However, the time available to design an imposition is often short, because changes in page content as dictated by advertising, editorial or fast breaking news stories may occur close to press time. Nevertheless, manually changing an imposition at the last minute can be both time consuming and very expensive because the operator will have to compose a new imposition essentially from scratch.

More often, imposition processes are executed on a computer workstation and assisted by a user, using an imposition software program, such as the Preps™ software by Scenic-Soft of Lynnwood, Wash., prior to printing by a printing device. An imposition software program creates an imposition description file that defines how pages are to be arranged and includes all the data required for a printing device to print the print sheet(s). Imposition description files contain user defined image data such as the pages or sub-pages of a document and page layout information for one or more print sheets. For example, a user can define an imposition layout that images four pages (4-up) at a time to a printer. The user may also define the page assignment in a certain way so that when the print sheet is folded and cut, the pages will be in the order defined by the user. Once the print sheets are printed, the print sheets are then folded and cut in accordance with the imposition description file to form one or more segments or signatures of the document which are then combined to form a complete document.

Software-based imposition assignment of one reader order list of pages to an imposition is common practice in the printing industry today. ScenicSoft's Preps™ program provides, either implicitly or explicitly, a means for the user to associate one reader order list of pages to a specific imposition layout. There is a fixed association between the pages of a document and the assignment of those pages to the single imposition layout.

SUMMARY OF THE INVENTION

The present invention recognizes the fixed association between the pages of a document and the assignment of those pages to an imposition and consequently the inability of a user to redo or undo an assignment of pages without the user having to create another imposition. The present invention solves this problem by providing a process for decoupling a document's reader order list of pages from any single imposition. The decoupling mechanism is a software object called a pageset which allows the reader order list of pages to be maintained separately from the actual imposition. In addition, the pageset allows the same reader order list of pages to be associated with multiple impositions, each one with a different layout configuration (e.g. different impositions could have print sheets of different sizes, and/or different folding, stacking and page arrangement characteristics). In one aspect of the invention, a process for creating an imposition plan and associating the imposition plan with a reader order list of pages is disclosed. The individual pages of a document are stored in a data file. An imposition description file is created and defined by a user. An imposition plan, based on the imposition description file, is created. An ordered set having multiple page positions is created. The individual pages of the document are assigned to positions in the ordered set, the ordered set having a reader order defined by the user. The positions in the ordered set are associated to the imposition plan, the layout of the individual pages in the imposition plan being arranged for printing on a media sheet. In other aspects of the invention, the invention provides a process for associating a reader order list of pages with multiple imposition plans, for associating multiple reader order lists of pages with a single imposition plan, and for associating multiple reader order list of pages with multiple imposition plans.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In the following description, numerous specific details are set forth to provide a thorough understanding of the present invention. It should be obvious, however, to one skilled in the art that these specific details need not be employed to practice the present invention. In other instances, well-known circuits, structures, techniques or methods have not been described in detail in order to avoid unnecessarily obscuring the present invention.

Figure 1:
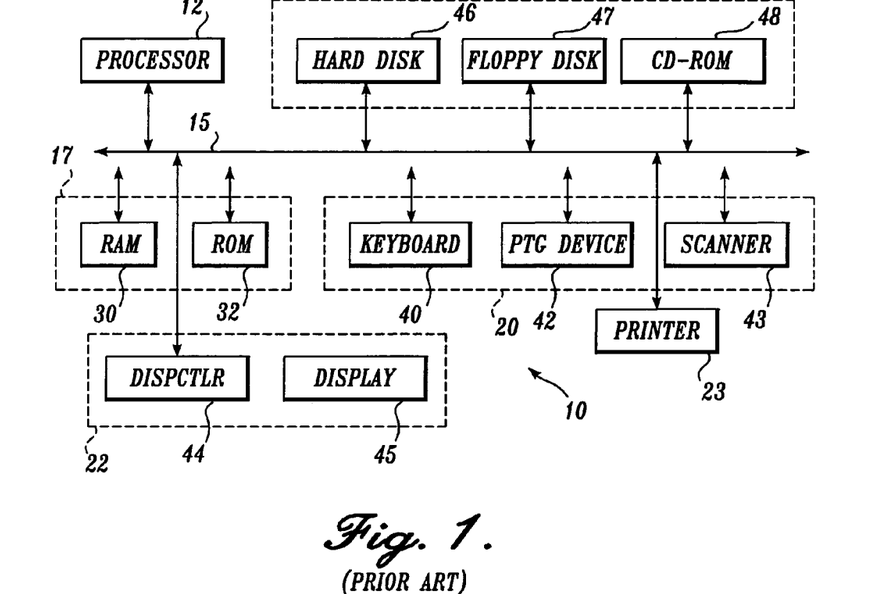
FIG. 1 is a prior art block diagram of a typical computer system in which the present invention may be embodied.

In one embodiment, the present invention is a method implemented on a computer. FIG. 1 and the following discussion are intended to provide a brief, general description of a suitable computing environment in which the invention may be implemented. Although not required, the invention will generally be implemented as a number of computer-executable instructions, such as program modules, being executed by a processor. Generally, program modules include routines, programs, objects, components, data structures, etc. that perform particular tasks or implement particular abstract data types. Moreover, those skilled in the art will appreciate that the invention may be practiced with other computer system configurations, such as multiprocessor systems, minicomputers, and mainframe computers. The invention may also be practiced in distributed computing environments where tasks are performed by remote processing devices that are linked through a communications network. In a distributed computing environment, program modules may be located in both local and remote memory storage devices.

FIG. 1 is a simplified block diagram of a computer system 10 in which the present invention may be embodied and by means of which the invention may be practiced. The computer system configuration illustrated at this high level is standard, and as such, FIG. 1 is labeled "PRIOR ART." A computer system such as system 10, suitably implemented to embody the present invention, however, is not prior art. The specific embodiments of the invention are embodied in a general-purpose computer system such as shown in FIG. 1, and the remaining description will generally assume that environment. However, the invention may be embodied in dedicated devices such as printer servers, and printer controllers.

In accordance with known practice, the computer system 10 includes one or more processors 12 that communicate with a number of peripheral devices via a bus subsystem 15. The peripheral devices typically include a memory subsystem 17, a user input facility 20, a display subsystem 22, output devices such as a printer 23, and a file storage system 25.

In this context, the term "bus subsystem" is used generically so as to include any mechanism for enabling the various components of the computer system 10 to communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of personal computers ("PCs") and workstations.

Bus subsystem 15 is shown schematically as a single bus, but a typical system has a number of buses such as a local bus and one or more expansion buses (e.g. ISA, MCA, or NuBus), as well as serial and parallel ports. Network connections are usually established through a device such as a network adapter on one of these expansion buses or a modem on a serial port. It is to be noted that the computer system may be a desktop system or a portable system or an embedded controller.

Memory subsystem 17 includes a number of memories including a main random access memory ("RAM") 30 and a read only memory ("ROM") 32 in which fixed instructions are stored.

User input facility 20 typically includes a keyboard 40 and may further include a pointing device 42 and a scanner 43. The pointing device may be an indirect pointing device such as a mouse, trackball, touchpad, or graphics tablet, or a direct pointing device such as a touchscreen incorporated into the display.

Display subsystem 22 typically includes a display controller 44 and a display device 45 coupled to the controller. The display device may be a cathode ray tube ("CRT"), a flat-panel device such as a liquid crystal display ("LCD"), or a projection device, for example. Display controller 44 provides control signals to the display device and normally includes a display memory for storing data defining the pixels that appear on the display device.

The file storage system 25 provides persistent (non-volatile) storage for program and data files, such as pagesets (described below) and their relationship to pages and impositions. File storage system 25 typically includes at least one hard disk drive 46 and at least one floppy disk drive 47. There may also be other devices such as a CD-ROM drive 48 and optical drives. Additionally, the system may include hard drives of the type with removable media cartridges.

Figure 2:
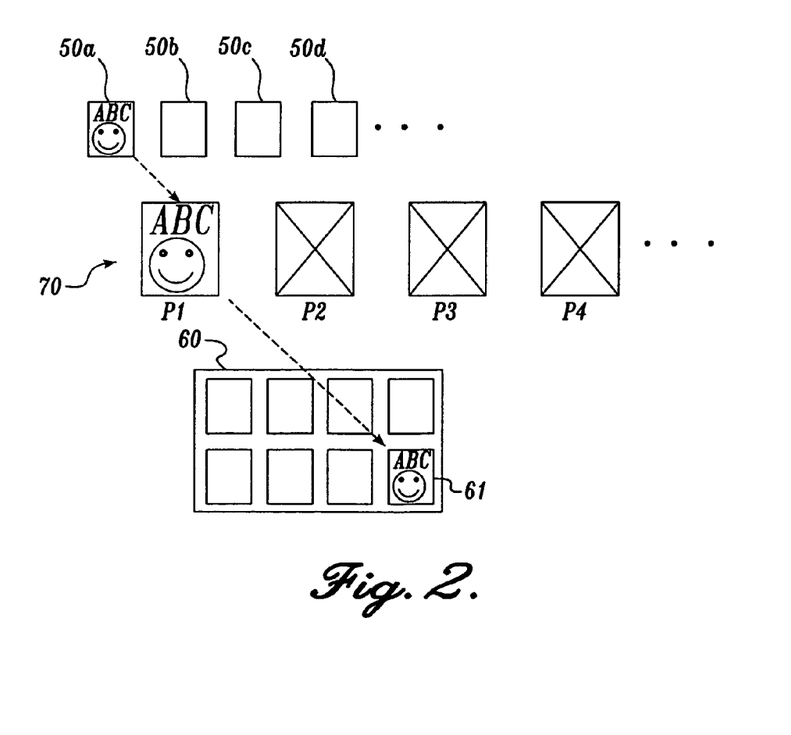
FIG. 2 is a diagram of individual pages of a pageset associated with one imposition plan according to one embodiment of the present invention.

Referring now to FIG. 2, the present invention provides a way to associate a set of pages 50a, 50b, 50c, 50d, . . . of a document with an imposition plan 60. As described above, in the prior art imposition process, there is a fixed association between the reader order list of pages of a document and the assignment of those pages to a specific imposition which includes a predefined layout. The present invention breaks this coupling of pages from the single imposition of pages for print sheets to allow the reader order list of pages to be maintained separately from the single imposition and to allow the reader order list of pages to be simultaneously associated with one or more imposition plans. The decoupling mechanism is a software objects called a pageset. A pageset defines the reader order via numbered positions and the pages assigned to those positions. A pageset can define the order of the pages in an entire document or the order of the pages in a subset of the document. Finally, pagesets can be associated with one or more imposition plans simultaneously.

FIG. 2 shows the individual pages 50a, 50b, 50c, 50d, . . . , of a document and a pageset 70 associated with an imposition plan 60. The individual pages 50a, 50b, 50c, 50d, . . . , comprise all or, more often, part of a document, such as a newspaper or magazine and are typically stored by a user as digital data files in computer readable memory. Individual pages 50a, 50b, 50c, 50d, . . . , are assigned to reader ordered positions P1, P2, P3, P4, . . . , in pageset 70. Individual page 50a, for example, is assigned to the first position P1 of the reader order of pageset 70. The positions of the pageset are consecutively numbered in reader order, the first position of pageset 70 is indicated by P1 whereas the fourth position is indicated by P4, for example. A descriptive prefix, such as an alphabetic character, may be assigned by the user to each position in pageset 70 to identify pageset 70. Pageset 70 contains n positions, specified by the user where n is the number of pages of the document or a subset of the document to be printed.

By itself, an imposition defines only the layout of each specific page of a document on a print sheet. By associating a pageset with an imposition plan, the pages assigned to the positions in the pageset can be mapped directly to the appropriate positions in the imposition plan. It is to be appreciated that pagesets can be created and used independent of whether they are associated with an imposition plan or not. However, for the imposition to work, the number of positions in the pageset must be the same as the number of positions in the imposition plan, otherwise, the association of the imposition plan and the pageset will be rejected.

Imposition plan 60 defines the layout of the individual pages for one or more print sheets. Pageset 70 is associated with imposition plan 60 in such a way that individual page 50a which is assigned to the first position P1 of pageset 70 is arranged in the appropriate position of imposition plan 60, such as the lower right position 61 of the eight page (8-up) imposition plan 60. This example is true when the imposition description file for imposition plan 60 specifies that the first page of the publication must appear in position 61. After the layout of the pages is defined by the imposition, the pages are printed onto print sheets which are later folded and cut. The final printed document will have n number of pages and a reader order showing page 50a to be first in this particular example.

Figure 3:
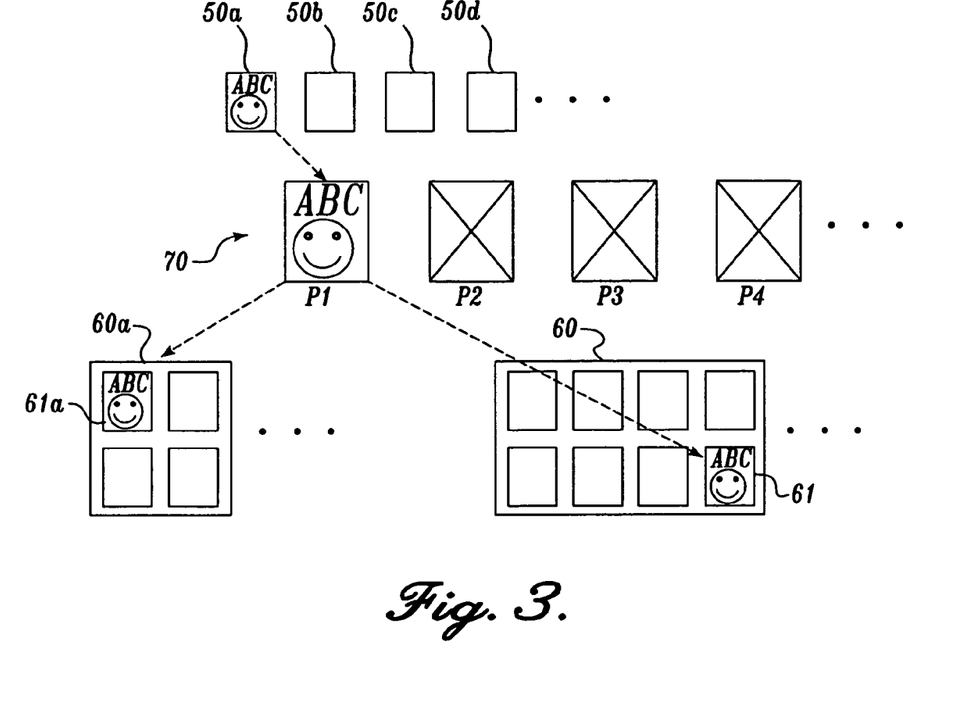
FIG. 3 is a diagram of individual pages of a pageset associated with multiple imposition plans simultaneously according to one embodiment of the present invention.

Referring now to FIG. 3, the individual pages 50a, 50b, 50c, 50d, . . . of a document and a pageset 70 are represented. Pageset 70 is associated with multiple imposition plans 60a and 60 according to one embodiment of the present invention. The individual pages 50a, 50b, 50c, 50d, . . . , are assigned to reader ordered positions P1, P2, P3, P4, . . . , in pageset 70. The first position of pageset 70 is indicated by P1 whereas the fourth position is indicated by P4. Individual page 50a, for example, is assigned to the first position P1 of the reader order of pageset 70. FIG. 3 shows that there are two imposition plans 60a and 60 which can be created by two separate imposition description files. Individual page 50a is assigned to the lower right position 61 of the 8-up imposition plan 60 and simultaneously assigned to the upper left position 61a of the 4-up imposition plan 60a. This example is true when the first imposition description file for imposition 60 specifies that the first page of the publication must appear in position 61 of imposition plan 60 and another imposition description file for a different imposition plan 60a specifies that the first page of the publication must appear in position 61a of imposition plan 60a. When the print sheets are later folded and cut, the final printed documents will have a reader order showing page 50a to be first in this particular example.

In the above example of FIG. 3, the association of one pageset with multiple imposition plans is advantageous. It allows the user to use pagesets in increasingly complex ways to help control page assignment and the use of multiple imposition plans. Printing industry companies may have several different output devices, such as plate making machines or proofing devices. Each output device may require a different imposition layout due to the physical size and characteristics of the output device. For example, one output device may be limited to imaging four pages onto the output media (e.g. print sheets), while another output device may be capable of imaging eight pages onto larger output media. One imposition plan 60a specifies a layout that images four pages (4-up) at a time to the output device while the other imposition plan 60 specifies a layout that images eight pages (8-up) at a time. By associating many imposition plans with one pageset, the user is able to output the pageset to any device which can accommodate one of the imposition layouts.

As shown in FIG. 3, two imposition plans 60 and 60a have been associated with pageset 70. In the conventional imposition method, a user may create an imposition layout and assign pages to it and output it to a printing device and the pages will come out in the correct layout for the imposition. In the present invention, the user is able to associate many different imposition plans simultaneously with the pageset whereas in the prior art method, the user cannot associate multiple imposition layouts simultaneously with a pageset. For example, assume the user assigns all the pages and outputs the pages to an 8-up device but during this process, the device malfunctions. Assume now that the user has to use a 4-up device instead. In this case, the user would have to create from scratch an imposition layout that is 4-up and make his/her page assignments and send the layout to the 4-up device. However, in the present invention, the user can preempt the problem of having a device break down by creating two imposition plans at the beginning that have no pages assigned to them. The user may create an 8-up imposition plan with no pages assigned and create a 4-up imposition plan with no pages assigned. The present invention then decides the order of pages that should go into both of these imposition plans and an association between the order of the pages and these two imposition plans simultaneously. So if a change in assignment is necessary, it would immediately be reflected in all the other imposition plans.

From the user's perspective, the user only needs to define the page order once, by assigning individual pages 50a, 50b, 50c, 50d, . . . , to pageset 70. Since the pageset is associated with two different imposition plans, the user can choose, at any time, to output the pages to either a 4-up or an 8-up output device without having to reassign pages to another pageset. This saves time, especially in situations where the primary output device is either busy or broken and the pages must be output to an alternate device.

Figure 4:
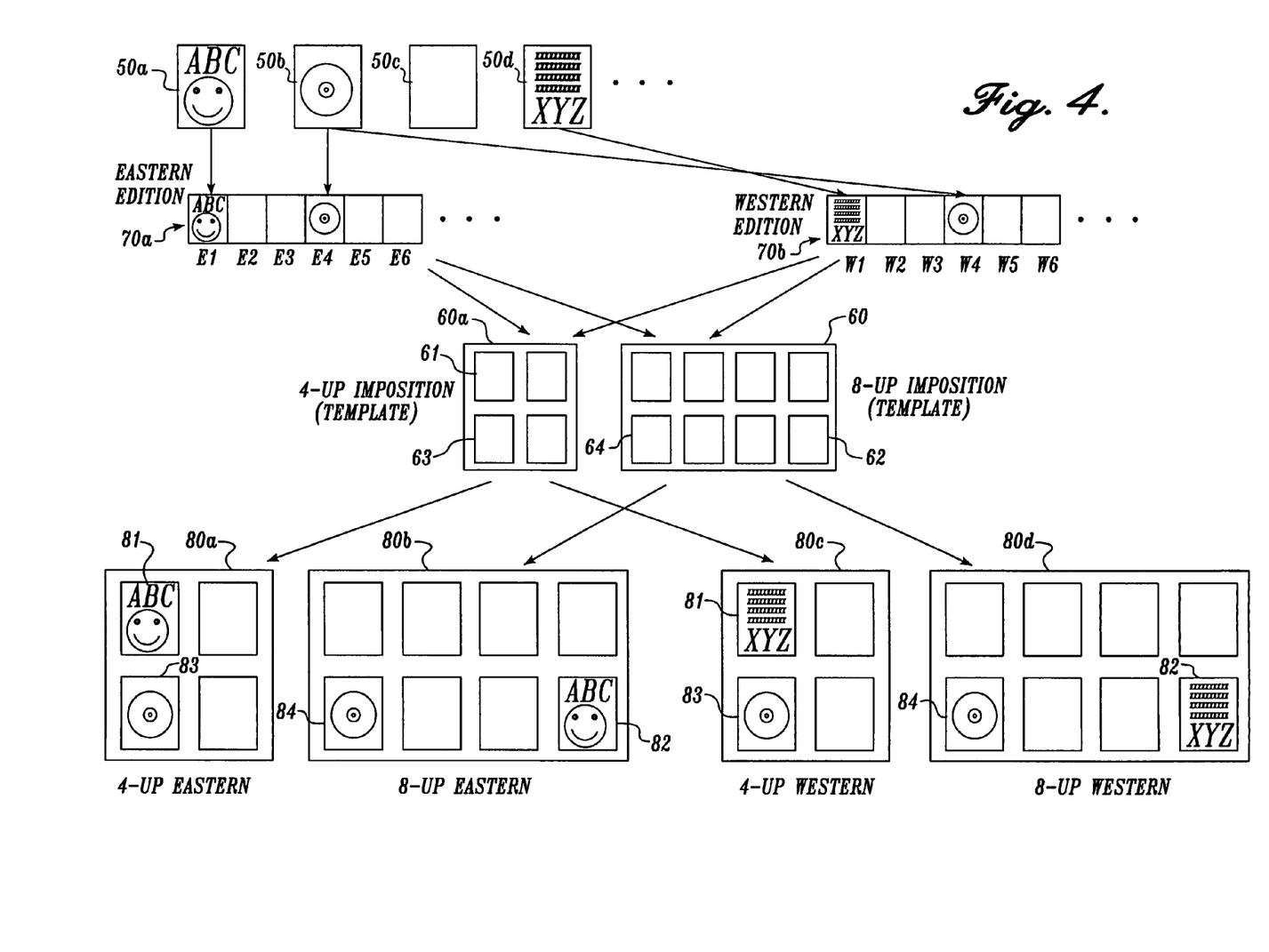
FIG. 4 is a diagram of individual pages of multiple pagesets associated with multiple imposition plans simultaneously according to one embodiment of the present invention.

FIG. 4 shows individual pages 50a, 50b, 50c, 50d, . . ., of multiple pagesets 70a, 70b, . . ., associated with multiple imposition templates 60 and 60a according to another embodiment of the present invention. This scenario shows how pagesets can be used in increasingly complex ways to help control page assignment and the use of multiple imposition plans. For instance, each pageset can be named, as well as a descriptive prefix given to each position in the pageset. These names are useful for jobs that contain multiple types of content. By naming the pagesets, page assignment is made easier because by knowing the position name in the pageset it is easy to know which page to put there. For example, one can set a prefix of C for the positions in a pageset called "Cover" linked to the imposition plan(s) used for cover pages and a prefix of B for the positions in a pageset called "Body" linked to the imposition plan(s) used for body pages.

Still referring to FIG. 4 another example demonstrates how the use of pagesets in accordance with the present invention simplifies working with documents or publications that have regional versions. Some publications are distributed to many different regions. Often, these publications are printed with specific regional content or in a particular regional language. In general, all of the regional versions of the publication are identical except for the regional variations. In some cases, there may be fifty or more regional versions of a publication. Conventionally, although the imposition layouts are identical, the page content for each layout position is potentially unique, so a separate copy of the imposition description file is required for each regional version. In the example of FIG. 4, assume that the publication has an Eastern version and a Western version. The user can create two pagesets, one with the name Eastern and prefix E and another with the name Western and the prefix W. In this example, each pageset has the same number of positions (but that is not a requirement). The user assigns individual pages to the positions of the Eastern and Western pageset, as appropriate for the particular edition of the publication.

Still referring to FIG. 4, the individual pages 50a, 50b, 50c, 50d, . . . are assigned to positions in pageset 70a (Eastern) and pageset 70b (Western). The first position of pageset 70a is indicated by E1 whereas the fourth position is indicated by E4. A prefix of E is used for the positions in the pageset named "Eastern" which specifies the pages in reader order for the Eastern version of the publication.

The first position of pageset 70b is indicated by W1 whereas the fourth position of pageset 70b is indicated by W4. A prefix of W is used for the positions in the pageset named "Western" which specifies the pages in reader order for the Western version.

Both pagesets, namely pagesets 70a and 70b, are simultaneously associated with multiple imposition templates 60 and 60a, which are used as template impositions for each of the pagesets. The combination of pageset 70a and imposition template 60a produces the final imposition plan 80a. The combination of pageset 70a and imposition 60 produces final imposition 80b. The combination of pageset 70b and imposition 60a produces the final imposition 80c. The combination of pageset 70b and imposition 60 produces final imposition 80d. The final result is four impositions, two for each of the Eastern and Western versions of the publication.

These combinations provide great flexibility, allowing the user to choose which of the final imposition plans (80a, 80b, 80c, 80d) to use to print the publications. This means that the Eastern version can be produced using imposition 80a on a smaller plate and press while the Western version is produced using imposition 80d on a larger plate and press. The user has the flexibility to decide at the last minute which plate and press to use for either of the regional versions.

Individual page 50a which is arranged in the first position E1 of pageset 70a is assigned to position 81 of the final imposition plan 80a (4-up Eastern) as well as position 82 of the final imposition plan 80b (8-up Eastern). Individual page 50d which is arranged in the first position of pageset 70b is assigned to position 81 of the final imposition plan 80c (4-up Western) as well as position 82 of the final imposition plan 80d (8-up Western). These correspond to positions 61 and 62 of imposition templates 60a and 60, respectively. Individual page 50b is common to both the Eastern and Western versions. Individual page 50b which is arranged in the fourth position of pageset 70a and the fourth position of pageset 70b is assigned to position 83 of the final imposition plan 80a, to position 84 of the final imposition plan 80b, to position 83 of the final imposition plan 80c and to position 84 of the final imposition plan 80d. These correspond to positions 63 and 64 of imposition templates 60a and 60, respectively.

Additional flexibility arises when the user must alter the imposition that is used by both regional versions. For example, if the user must alter imposition template 60 then, in the current invention, the user simply makes the edits to the original imposition description file that was used to create imposition template 60 and re-creates a new imposition template 60 based on the modified imposition description file 60. Imposition template 60 is then re-associated with pageset 70a and pageset 70b. The re-association preserves the page assignments, and the imposition changes only need to be made once for all regional versions.

Flow charts of routines illustrating the various imposition programs for operating computer system 10 in FIG. 1 will now be described below with respect to FIGS. 5–9.

Figure 5:
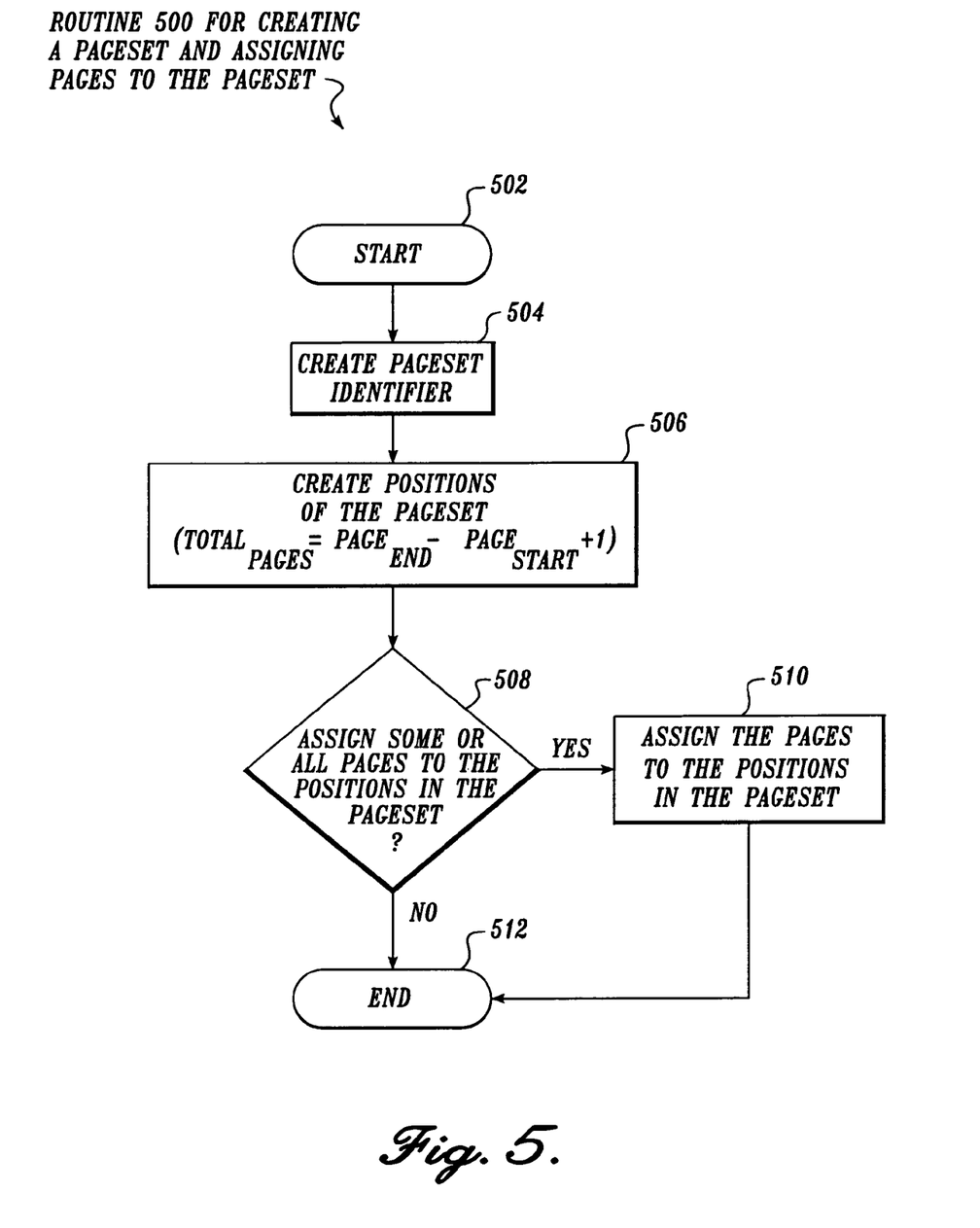
FIG. 5 is a flow chart of a representative routine for creating a pageset and assigning pages to the pageset according to one embodiment of the present invention.

FIG. 5 is a flow chart showing a representative routine 500 for creating a pageset and assigning pages to the pageset according to one embodiment of the present invention. Routine 500 begins at block 504, where a pageset identifier is created. As discussed above in connection with FIG. 4, the information necessary to identify a pageset may include, for example, the name of the pageset, the prefixes associated with each position so as to identify the positions in the pageset, the starting page number for the pageset, and the total number of pages for the pageset. The starting page number may be 1 or any number greater than zero. However, it is to be appreciated that numerous other identifying information may be used to identify a pageset without departing from the scope of the present invention.

At block 506, the positions of the pageset are created. The positions are based on the page range or the total number of pages of the pageset, where Total Pages=Page$_{End}$–Page$_{Start}$+1. For example, if the start page is 81 and the end page is 90, then the page range for this particular pageset is ten pages. From block 506, the routine 500 continues to block 508, where a determination is made as to whether some or all the pages will be assigned. If at block 508, a determination is made that some or all the pages will be assigned, routine 500 continues to block 510. At block 510, the pages are assigned to the positions in the pageset and the routine 500 ends at block 512. However, if at block 508, a determination is made that none of the pages will be assigned, routine 500 continues to block 512 and the routine 500 ends.

Figure 6:
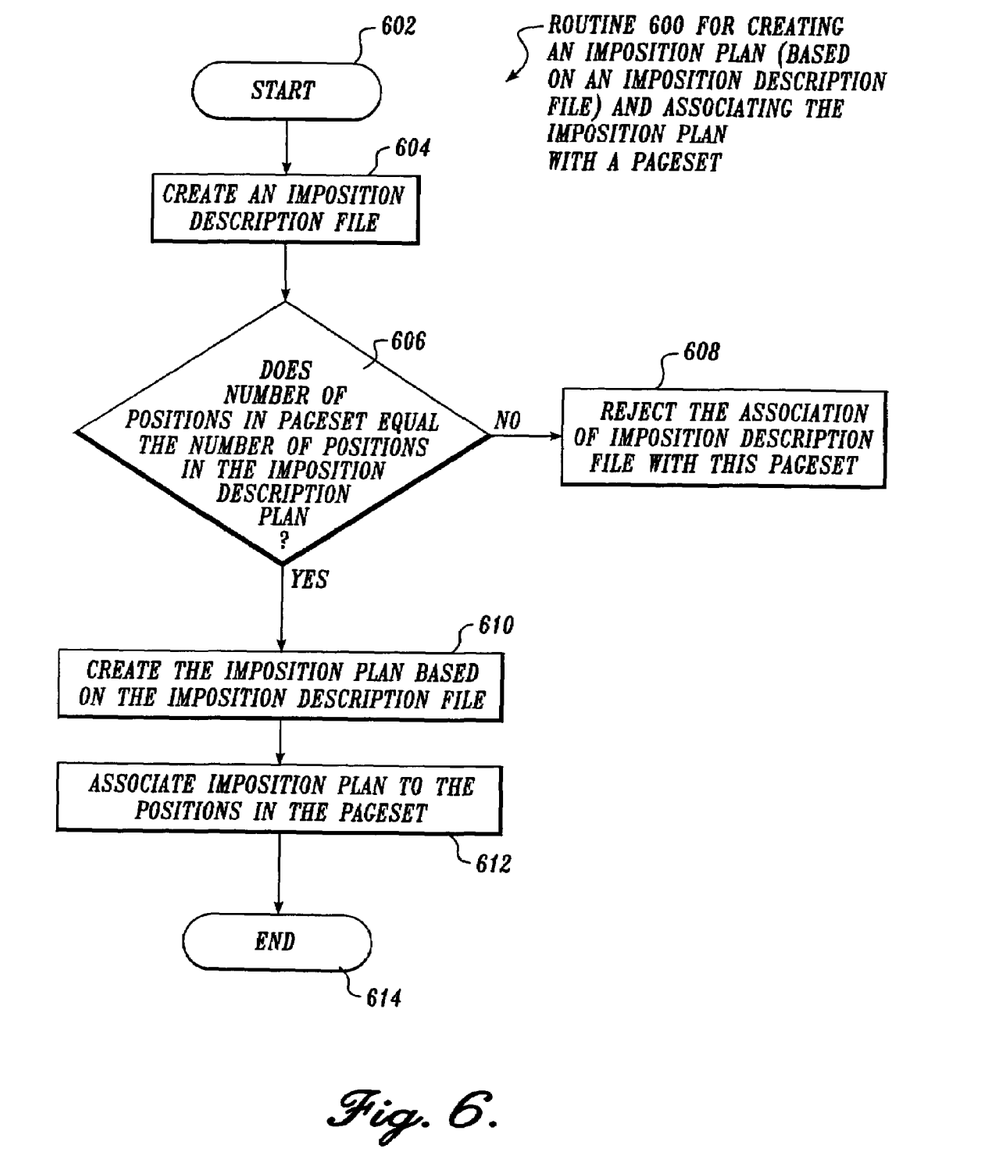
FIG. 6 is a flow chart of a representative routine for creating an imposition plan (based on an imposition description file) and associating the imposition plan with a pageset according to one embodiment of the present invention.

Referring now to FIG. 6, a representative routine 600 for creating an imposition plan (based on an imposition description file) and associating the imposition plan with a pageset according to one embodiment of the present invention will be described. Routine 600 begins at block 604 where an imposition description file is created. As explained above, imposition description files are created by conventional imposition software programs. Routine 600 continues from block 604 to block 606 where a determination is made as to whether the number of positions in a pageset equal the number of positions in the imposition description file. This is an important determination because for the imposition to work, the pageset and the imposition plan must have an equal number of positions. If this determination is "no," the routine 600 branches to block 608 where the association of the imposition description file and the pageset is rejected. If, however, this determination is "yes," the routine 600 branches to block 610 where an imposition plan is created based on the imposition description file. Essentially, the imposition plan reads the imposition description file and creates a representation in a computer memory of the imposition description file.

Routine 600 then continues from block 610 to block 612. At block 612, the imposition plan is associated to the positions in the pageset. The routine 600 ends at block 614.

Figure 7:
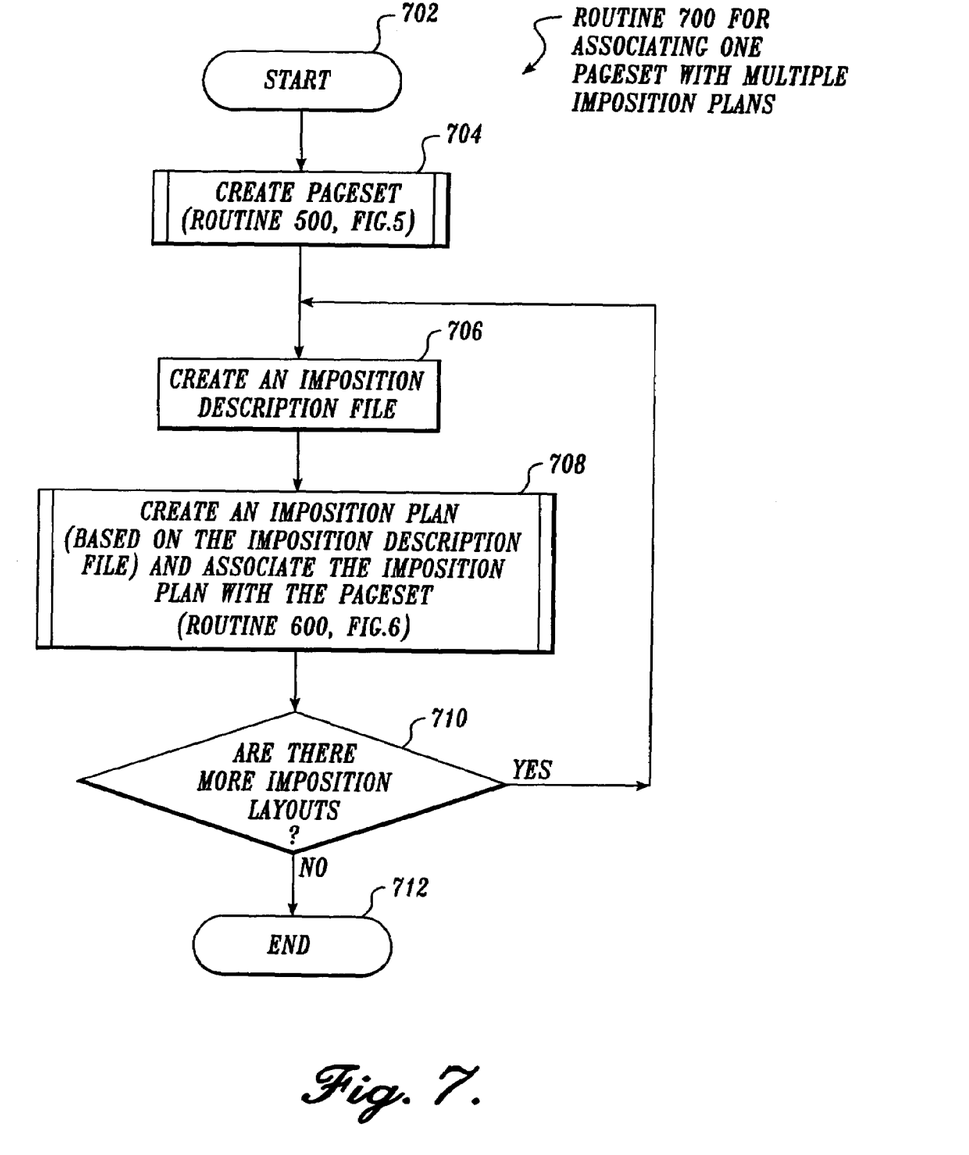
FIG. 7 is a flow chart of a representative routine for associating one pageset with multiple imposition plans according to one embodiment of the present invention.

Referring now to FIG. 7, the method of the present invention will now be described for associating one pageset with multiple imposition plans. As described above, compared to the conventional method of linking one pageset to one imposition, it may be desirable to associate one pageset with multiple imposition plans, such as when one may want to print the same document on different presses that require different imposition plans or where one wants to make a last minute press change. To achieve the association of a pageset with many imposition plans simultaneously, the software would have separate software objects representing the pagesets and imposition layouts. Another software object would maintain the association between a pageset and an imposition layout. FIG. 7 shows a representative routine for associating one pageset with multiple imposition plans according to one embodiment of the present invention.

Routine 700 begins at block 704, where a pageset is created. An illustrative routine 500 for creating a pageset is described above with respect to FIG. 5. From block 704, the routine 700 continues to block 706, where an imposition description file is created. The routine 700 continues to block 708, where an imposition plan (based on the imposition description file) is created and the imposition plan is associated with the pageset. From block 708, routine 700 continues to block 710, where a determination is made as to whether there are more imposition layouts desired by the user. If, at block 710, it is determined that there are more imposition layouts, routine 700 branches to block 706 where input may again be received for the creation of another imposition description file. This provides for the association of one pageset with multiple imposition plans. Routine 700 ends at block 712 when there are no more imposition layouts for description files to be created.

Figure 8:
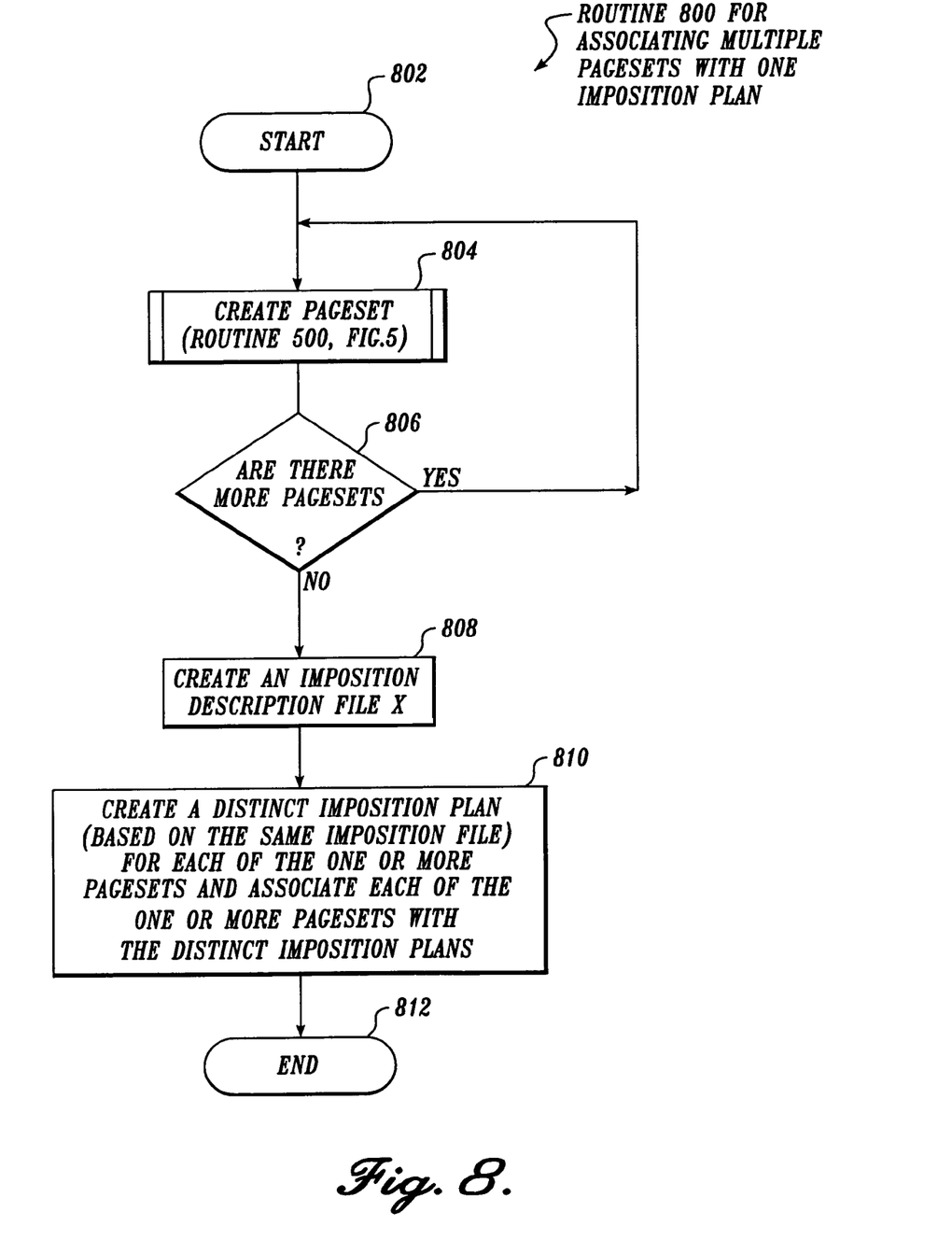
FIG. 8 is a flow chart of a representative routine for associating multiple pagesets with one imposition plan.

FIG. 8 is an representative routine for associating multiple pagesets with one imposition plan. Routine 800 begins at block 804 where a pageset is created. A representative routine 500 for creating a pageset is described above with respect to FIG. 5. From block 804, the routine 800 continues to block 806, where a determination is made as to whether or not more pagesets are desired. If so, this loop continues until all pagesets have been created. Then routine 800 continues from block 806 to block 808, an imposition description file X is created, then to box 810 where a distinct imposition plan (based on the same imposition description file X) is created for each of the one or more pagesets and each of the one or more pagesets is associated with the imposition plan based on description file X. In other words, each pageset has its own imposition plan, but each of these imposition plans is based on a single imposition plan (template) that was created from the imposition description file X. After this step, routine 800 ends at block 812.

Associating multiple pagesets with one imposition plan is advantageous in situations where it is desirable to print several regional versions of a publication. This is true where the publication is distributed to many different regions. Often, these publications are printed with specific regional content or in a particular regional language. In general, all of the regional versions of the publication are identical except for the regional variations. In some cases, there may be fifty or more regional versions of a publication. Conventionally, although, the imposition layouts are identical, the page content for each layout position is potentially unique, so a separate copy of the imposition layout is required for each regional version.

To deal with the regional versions, one pageset is created for each region and page content is assigned, as explained above, to each pageset. Rather than associating each pageset with a separate (yet identical) imposition, routine 800 allows the user to associate all of the regional pagesets with a single imposition plan for a specific layout defined by an imposition description file. One benefit is that since each pageset is associated with a single imposition plan, if any subsequent changes to the imposition layout are required for all regional versions, the user only needs to change one imposition rather than making the change to many separate impositions.

Figure 9:
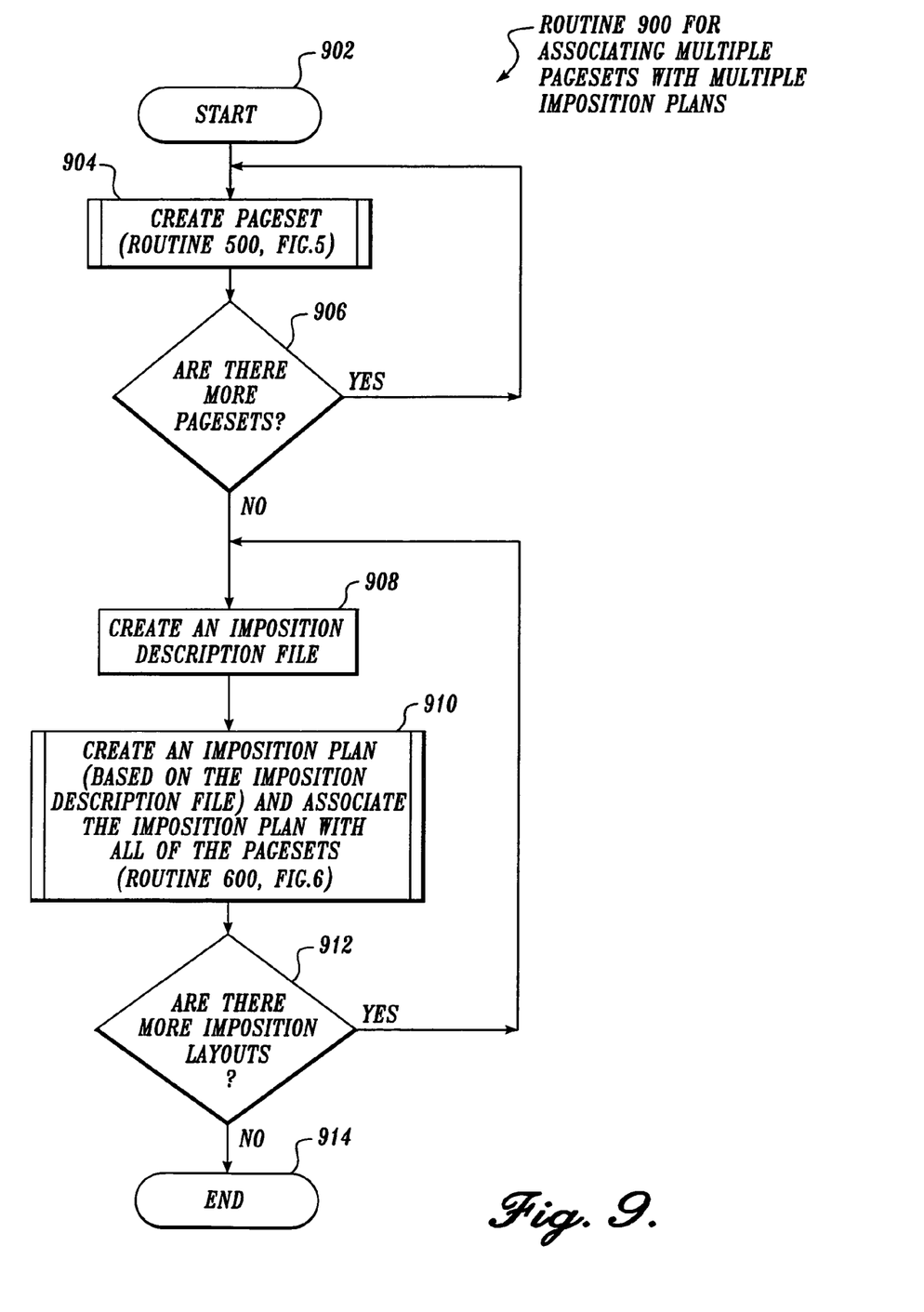
FIG. 9 is a flow chart of a representative routine for associating multiple pagesets with multiple imposition plans according to one embodiment of the present invention.

FIG. 9 is a representative routine for associating multiple pagesets with multiple imposition plans according to one embodiment of the present invention. Routine 900 begins at block 904, where a pageset is created. As described above, FIG. 5 is an illustrative routine for creating a pageset. From block 904, the routine 900 continues to block 906, where a determination is made as to whether there are more pagesets. If, at block 906, it is determined that there are more pagesets, routine 900 branches to block 904, where input may again be received for the creation of more pagesets. If there are no more pagesets to be created, block 906 continues to block 908, where an imposition description file is created. From block 908, the routine 900 continues to block 910 where an imposition plan (based on the imposition description file) is created and the imposition plan is associated with all of the pagesets. An illustrative routine 600 for creating an imposition plan for associating with the pageset(s) is described above with respect to FIG. 6. From block 910, routine 900 then continues to block 912, where a determination is made as to whether there are more imposition layouts. If, at block 912, it is determined that there are more imposition layouts, routine 900 branches to block 908 where another imposition description file is created. If it is determined at block 912 that there are no more imposition layouts, then routine 900 ends at block 914.

Associating multiple pagesets with multiple imposition plans provides the benefits of the previously described associations. Routine 900 allows the user to create different imposition layouts that can be associated with the same pageset. This provides the flexibility of sending the output to different format devices at the same time and without the reassignment of pages. At the same time, routine 900 allows many pagesets to be associated with a single imposition layout. This simplifies the management of regional versions, as described above, especially with output to different devices requiring different impositions.

It should be appreciated that the present invention provides a method for associating one or more pagesets with one or more impositions. While an illustrative embodiment of the invention has been illustrated and described, it will be appreciated that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

The embodiments of the invention in which an exclusive property or privilege is claimed are defined as follows:

1. A method for formatting a document having individual pages in preparation for printing the individual pages on a media sheet, the method comprising:
   storing the individual pages of the document in a data file;
   creating an imposition description file defined by a user;
   creating an imposition plan based on the imposition description file the imposition plan defining a layout of pages for one or more print sheets, the layout specifying a plurality of page locations on the print sheets;
   creating an ordered set having multiple positions;
   assigning the individual pages of the document to the positions of the ordered set in a reader order defined by a user; and
   associating the positions in the ordered set of pages to the page locations of the imposition plan, the layout of the individual pages in the imposition plan being arranged for printing on the media sheet.

2. The method of claim 1, wherein the imposition plan has the same number of page positions as the number of positions in the ordered set.

3. The method defined in claim 1, including creating multiple imposition description files, creating multiple different imposition plans based on the multiple imposition description files, and associating the positions in the ordered set of pages to the multiple imposition plans.

4. The method defined in claim 1, including creating multiple ordered sets each having multiple positions, assigning individual pages to positions of the ordered sets, respectively, each in a reader order defined by a user, and associating the positions in the ordered sets to the imposition plan.

5. A computer system including computer readable memory having an imposition description file stored therein, the imposition description file containing the individual pages of a document and an imposition for the individual pages to enable printing of the individual pages on media sheets, and a computer readable medium having computer executable instructions for formatting a document of the individual pages in preparation for printing the individual pages, the computer executable instructions performing the steps comprising:
   creating an imposition plan based on the imposition description file, the imposition plan defining a layout of pages for one or more print sheets the layout specifying a plurality of page locations on the pint sheets;
   creating a pageset comprising an ordered set having multiple positions;
   assigning the individual pages to the positions of the pageset in a reader order defined by a user; and
   associating the positions in the pageset with the page locations of the imposition plan.

6. The computer system defined in claim 5, in which the computer executable instructions perform the step of associating multiple pagesets with the imposition plan.

7. The computer system defined in claim 5, in which the computer executable instructions perform the step of associating multiple imposition plans based on multiple imposition description files with a pageset.

8. The computer system defined in claim 5, in which the computer executable instructions perform the step of associating multiple imposition plans based on multiple imposition description files with multiple pagesets.

9. A method for formatting a document having individual pages in preparation for printing the individual pages on a media sheet, the method comprising:
   using a software object to represent an imposition plan based on an imposition description file, the imposition plan defining a layout of pages for one or more print sheets, the layout specifying a plurality of page locations on the print sheets;
   using another software object to represent an ordered set having multiple positions;
   associating the individual pages of the document to the positions of the ordered set in a reader order defined by a user; and
   associating the positions in the ordered set to the page locations of the imposition plan.

10. A computer system including a computer-readable medium having an imposition description file stored therein, said file including the pages of a document, a reader order for the pages and an imposition for formatting the document in preparation for printing the individual pages on a media sheet, and computer software residing in computer memory including:
   one software object representing an imposition plan based on the imposition description file, the imposition plan defining a layout of pages for one or more print sheets the layout specifying, a plurality of page locations on the print sheets;
   one software object representing an ordered set having multiple positions;
   computer executable instructions for assigning the individual pages of the document to the positions of the ordered set; and
   computer executable instructions for associating the positions in the ordered set to the imposition plan, the layout of the individual pages in the imposition plan being arranged for printing on the media sheet.

* * * * *

UNITED STATES PATENT AND TRADEMARK OFFICE
CERTIFICATE OF CORRECTION

| | | |
|---|---|---|
| PATENT NO. | : 7,016,068 B1 | Page 1 of 1 |
| APPLICATION NO. | : 09/649315 | |
| DATED | : March 21, 2006 | |
| INVENTOR(S) | : Joe Gnocato et al. | |

It is certified that error appears in the above-identified patent and that said Letters Patent is hereby corrected as shown below:

| | |
|---|---|
| Column 11, Claim 1, line 26 | Please delete "the imposition plan defining a layout of pages for one or more print sheets, the layout specifiying a plurality of page locations on the print sheets;" |
| Column 11, Claim 1, line 34 | Please delete "page locations of the" |
| Column 12, Claim 5, line 2 | Please delete "the imposition plan defiing a layout of pages for one or more print sheets the layout specifying a plurality of page locations on the pint sheets;" |
| Column 12, Claim 5, lines 9 | Please delete "page locations of the" |
| Column 12, Claim 9, line 26 | Please delete "the imposition plan defining a layout of pages for one or more print sheets, the layout specifying a plurality of page locations on the print sheets;" |
| Column 12, Claim 9, line 31 | Please delete "corresponding to the pages of the document;" |
| Column 12, Claim 9, line 35 | Please delete "to the page locations of the imposition plan." Please add after "ordered set" -- of pages to the imposition plan:-- |
| Column 12, Claim 10, line 45 | Please delete "the imposition plan defining a layout of pages for one or more print sheets the layout specifying, a plurality of page locations on the print sheets;" |

Signed and Sealed this

Twenty-eighth Day of August, 2007

JON W. DUDAS
*Director of the United States Patent and Trademark Office*